United States Patent [19]
Beaudet et al.

[11] Patent Number: 5,697,667
[45] Date of Patent: Dec. 16, 1997

[54] DRIVER KNEE ENERGY-ABSORBING PLATE

[75] Inventors: Brian M. Beaudet; Mark W. Crossman, both of Birmingham; Dale A. Bode, Wixom; Theodore W. Tobin, Lincoln Park, all of Mich.

[73] Assignee: Chrysler Corporation, Auburn Hills, Mich.

[21] Appl. No.: 679,887

[22] Filed: Jul. 15, 1996

[51] Int. Cl.⁶ .................................................. B60R 21/045
[52] U.S. Cl. ............................................ 296/189; 280/752
[58] Field of Search ................................. 296/70, 72, 74, 296/189, 194; 280/752, 751; 180/90

[56] References Cited

U.S. PATENT DOCUMENTS

| | | | |
|---|---|---|---|
| 4,709,943 | 12/1987 | Yoshimura et al. | 280/752 X |
| 4,978,136 | 12/1990 | Tomita et al. | 280/752 X |
| 5,201,544 | 4/1993 | Matano et al. | 280/752 X |
| 5,456,494 | 10/1995 | Witkovsky | 296/189 X |
| 5,482,319 | 1/1996 | Yoshimura et al. | 280/752 |

*Primary Examiner*—Joseph D. Pape
*Attorney, Agent, or Firm*—Lawrence J. Shurupoff

[57] ABSTRACT

An energy-absorbing plate for absorbing energy from the force of a knee of the driver of a motor vehicle when the driver is thrown forward in response to a frontal impact. The plate has a knee impact zone and is mounted on rigid vehicle support structure in a position placing the impact zone directly in front of the right knee of the driver. The impact zone is connected to an upper wall portion of the plate by a generally horizontal shelf placing the impact zone closer to the right knee and providing additional stiffness for better crashworthiness. The plate has a bead adjacent one side of the impact zone capable of deforming into a shallower channel shape upon impact. The impact zone has a relatively large radius side edge portion capable of rolling with the deformation of the impact zone to improve energy absorption.

10 Claims, 5 Drawing Sheets

DRIVER KNEE ENERGY-ABSORBING PLATE

FIELD OF INVENTION

This invention relates to an energy-absorbing plate for an instrument panel kneeblocker application.

BACKGROUND AND SUMMARY OF THE INVENTION

The energy-absorbing plate of this invention is designed particularly for absorbing energy from the right knee of the driver in a severe frontal impact or collision. The plate has a knee impact-receiving wall or zone designed to efficiently absorb knee and lower torso energy. A shelf above the wall portion provides additional stiffness to the plate for better crashworthiness and locates the impact zone in closer proximity to the knee of the occupant. This improves the effectiveness of the restraint system by permitting additional knee penetration into the instrument panel.

To further improve energy absorption, the plate has a vertical bead near the impact zone. In a severe frontal collision, the right knee of the driver will deform the impact zone and cause the bead to open into a more shallow depression and consequently will allow more knee penetration. The potential for more knee penetration is desirable for better energy management.

The plate also preferably has a large radius along one side to allow early restraint and additional knee penetration. When the plate is contacted in the typical knee impact zone, the large radius provides opportunity for the plate to be drawn forward for improved energy management.

One purpose of restraining the knee with an energy absorbing plate is to prevent the driver, when thrust forward in a frontal impact, from submarining under the steering column. This so-called submarining is undesirable because it places the chest of the driver below the path of the air bag when it deploys so that the air bag does not provide maximum protection. Another reason for preventing submarining is that the driver's hands and arms, when engaging the steering wheel, will push upwardly on the steering column in a frontal collision and not along a direct axial path. It is of great importance that the force of the driver against the steering column be directed axially so that the collapse of the steering column can be gradually resisted by the energy-absorbing mechanism. An upward push on the steering column, due to submarining, would obviously be undesirable.

One object of this invention is to provide an energy-absorbing plate for the knee of a driver which has the foregoing features and capabilities.

Another object is to provide an energy-absorbing plate which is of simple construction and highly capable of performing its intended function.

Other objects, features and advantages of the invention will become more apparent as the following description proceeds, especially when considered with the accompanying drawings.

DETAILED DESCRIPTION OF THE PREFERRED EMBODIMENT

Figure 1:
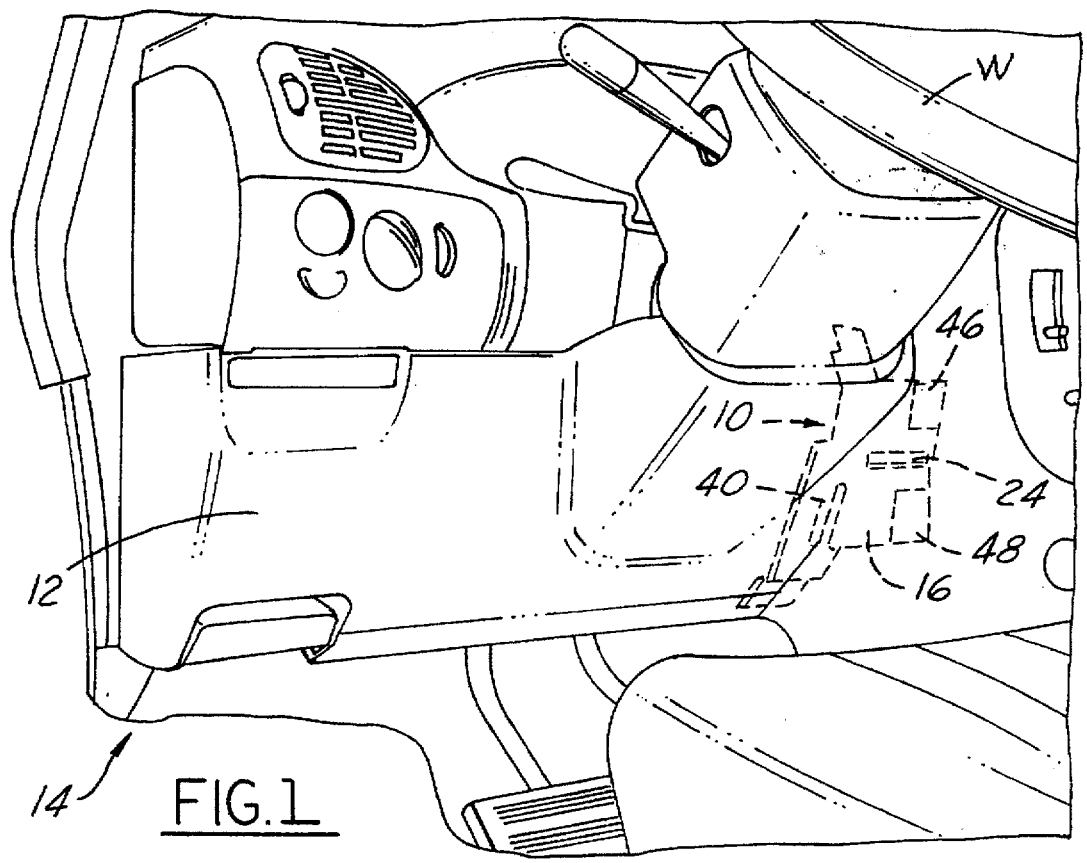
FIG. 1 is a fragmentary perspective view of the inside of a vehicle as seen from a position slightly to the left of a driver seated in the left-hand driver's seat adjacent to the steering wheel, showing the energy-absorbing plate of this invention in broken lines and covered by the instrument panel.
Figure 3:
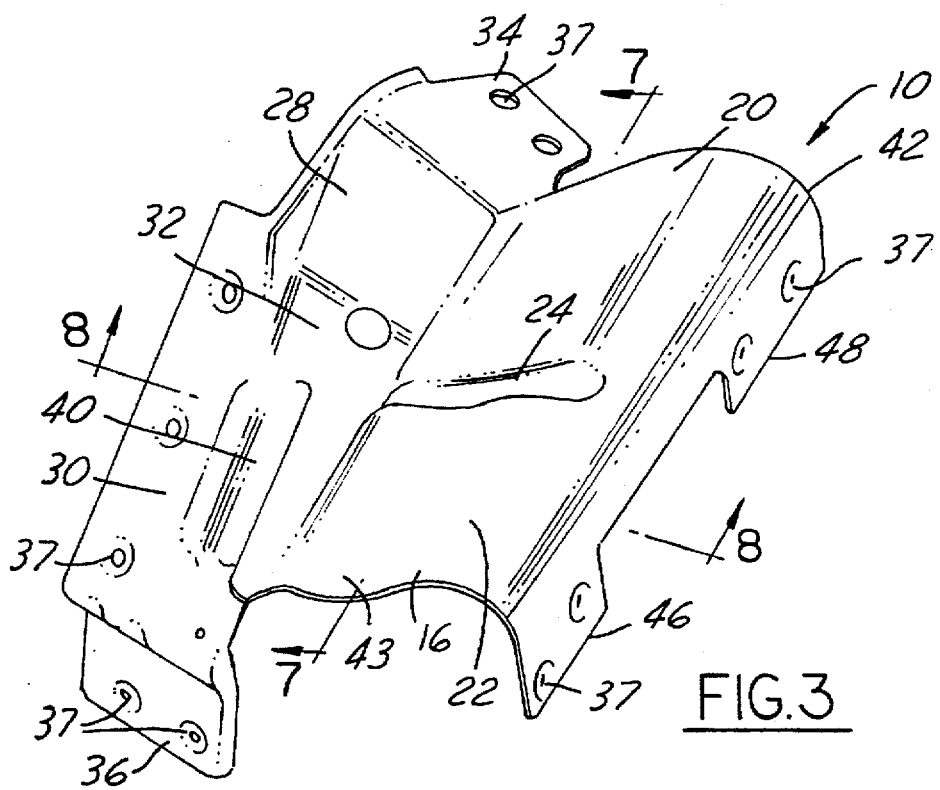
FIG. 3 is a perspective view of the energy-absorbing plate, showing the rear side thereof facing the driver.
Figure 2:
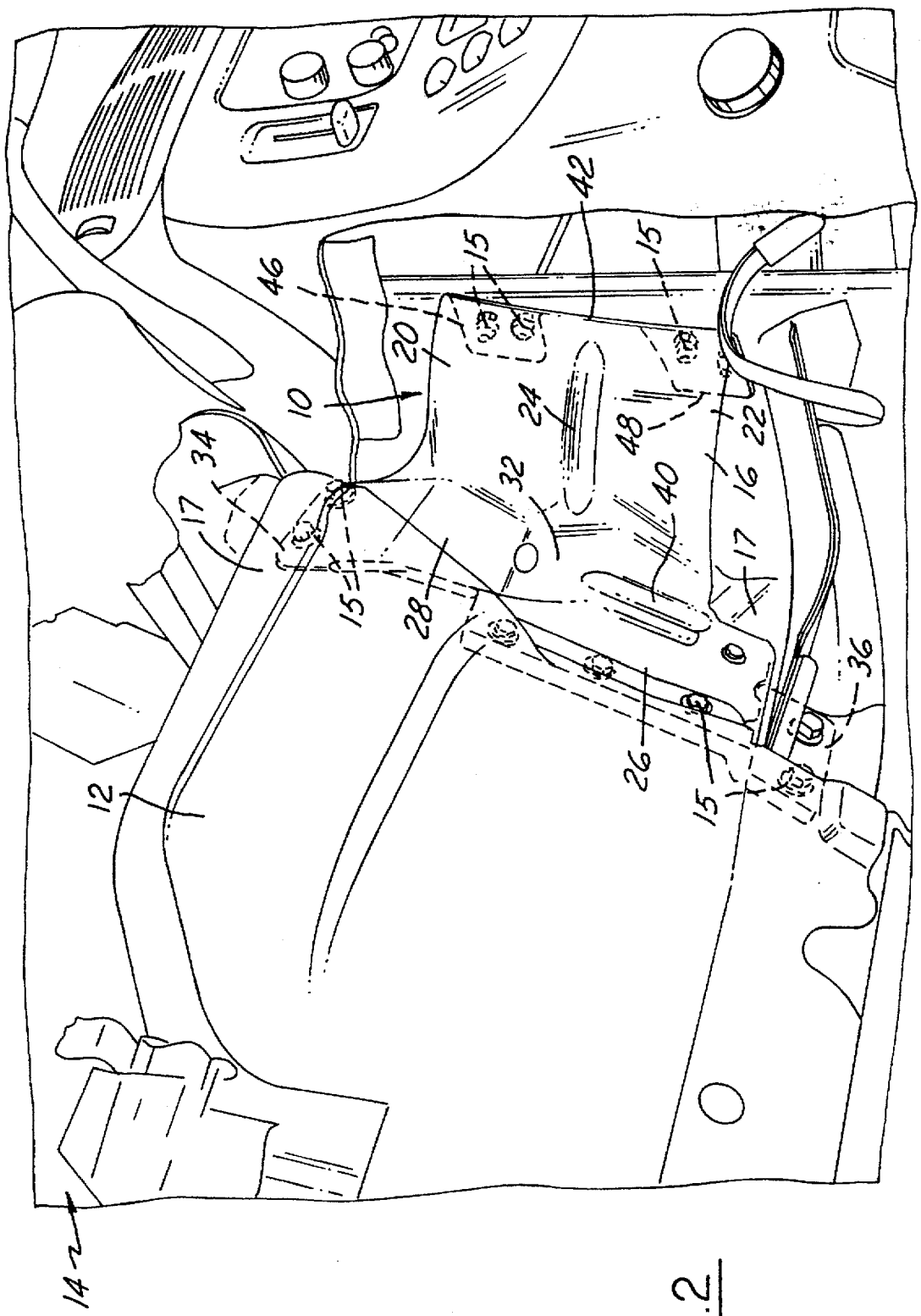
FIG. 2 is a fragmentary perspective view on an enlarged scale and with the instrument panel partially removed to expose the energy-absorbing plate.
Figure 4:
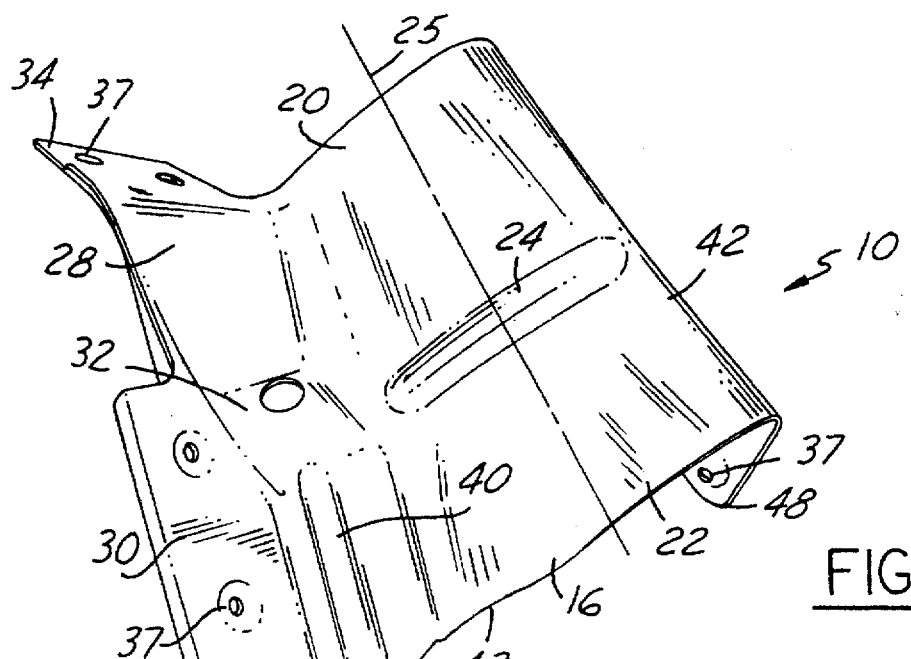
FIGS. 4 and 5 are perspective views of the energy-absorbing plate seen from different angles, FIG. 5 showing the front side.
Figure 5:
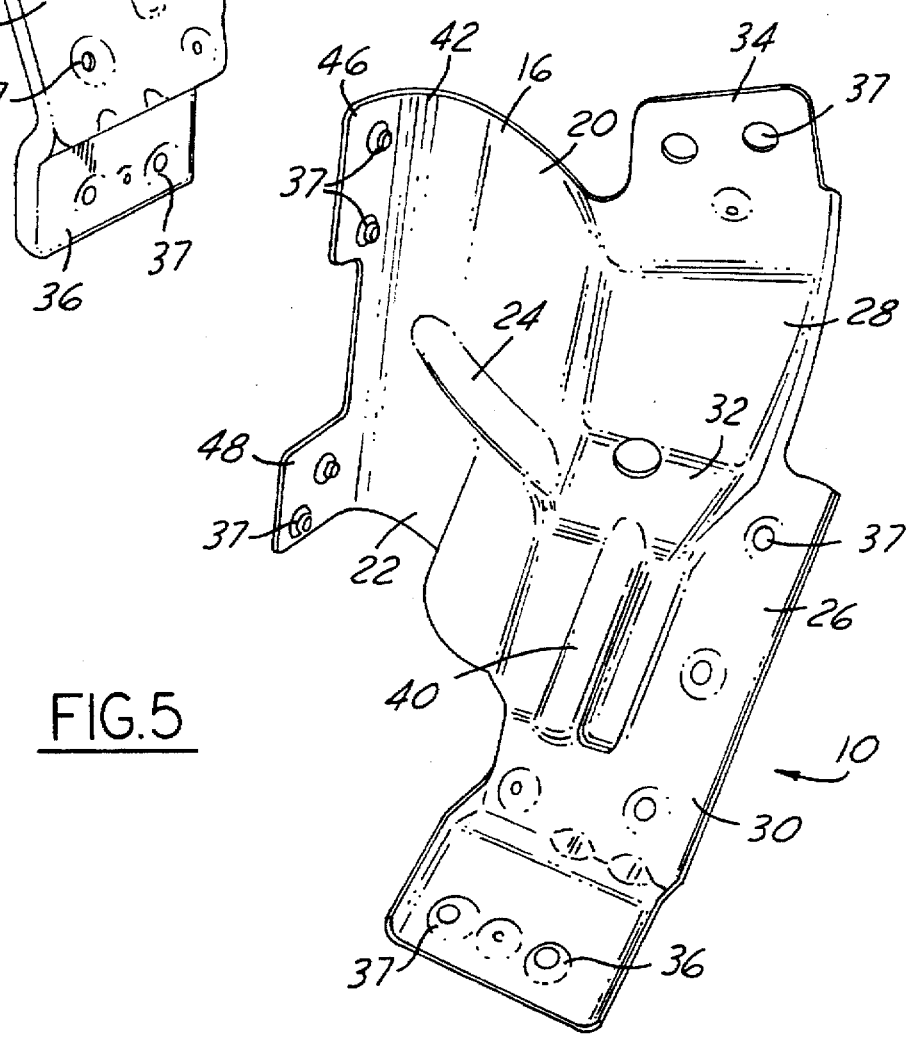

Referring now more particularly to the drawings, and especially to FIGS. 1 and 2, there is shown an energy-absorbing plate 10 covered and concealed by the external cover layer 12 of the instrument panel of an automotive vehicle 14. The plate 10 is firmly secured as by bolts 15 to rigid vehicle support structure 17 on the right, side of a driver seated behind the steering wheel W, in a position just forwardly of the driver's right knee.

The plate 10 is made of a flexible resilient material and is preferably a sheet metal stamping. Plate 10 is of integral one-piece construction and has a wall 16 which, when the plate is mounted as shown in FIGS. 1 and 2, extends generally vertically (See FIG. 6).

Referring more particularly to FIGS. 3-5 and 7-9, wall 16 has an upper wall portion 20 and a lower wall portion 22. The lower wall portion is displaced rearwardly relative to the upper wall portion and is integrally connected to the upper wall portion by a horizontal shelf 24. The shelf 24 extends transversely of the wall 16 and is bisected by a vertical center line 25 passing through the upper and lower wall portions midway between the opposite side edges thereof. The lower wall portion 22 provides an impact zone to be engaged by the right knee of the driver.

The plate 10 has an integral mounting strip 26 which extends along the left side of the wall 16 as the plate is viewed by a person sitting in the driver's seat. The mounting strip 26 has a flat generally vertical upper portion 28 laterally opposite the upper wall portion 20, and a flat generally vertical lower portion 30 laterally opposite the lower wall portion 22. The lower mounting strip portion 30 is offset rearwardly with respect to the upper mounting strip portion 28 and is joined thereto by an integral, inclined connecting strip portion 32. Integral tabs 34 and 36 at the upper and lower ends of the mounting strip 26 have holes 37 for receiving attaching bolts 15 used to secure the plate to the rigid vehicle support structure 17. Similar holes and attaching bolts are provided in the mounting strip portion 30.

Formed in the lower mounting strip portion 30 is an elongated, vertical, channel-shaped bead 40 which is laterally spaced to the left of the lower wall portion 22. The bead 40 is depressed forwardly from the plane of the lower mounting strip portion 30. Along the side of the wall 16 opposite mounting strip 26, the wall 16 is formed with a relatively large radius portion 42 which extends vertically along both the upper and lower wall portions 20 and 22, curving to form a forwardly opening channel and terminating in the upper and lower mounting tabs 46 and 48 which are provided with holes 37 to receive bolts 15 for attaching the plate to the rigid vehicle structure 17.

The plate 10 is positioned in front of and normally concealed by cover layer 12 of the instrument panel with its lower wall portion or impact zone 22 spaced only a short distance directly in front of the right knee of the driver. The wall portion 22 is concave on the rear side, that is, it forms a rearwardly facing channel, to conform more or less to the shape of the driver's right knee. At the left side of the lower wall portion 22 and spaced to the right of bead 40, the wall portion 22 has a vertical, forwardly facing channel-shaped section 43.

Figure 6:
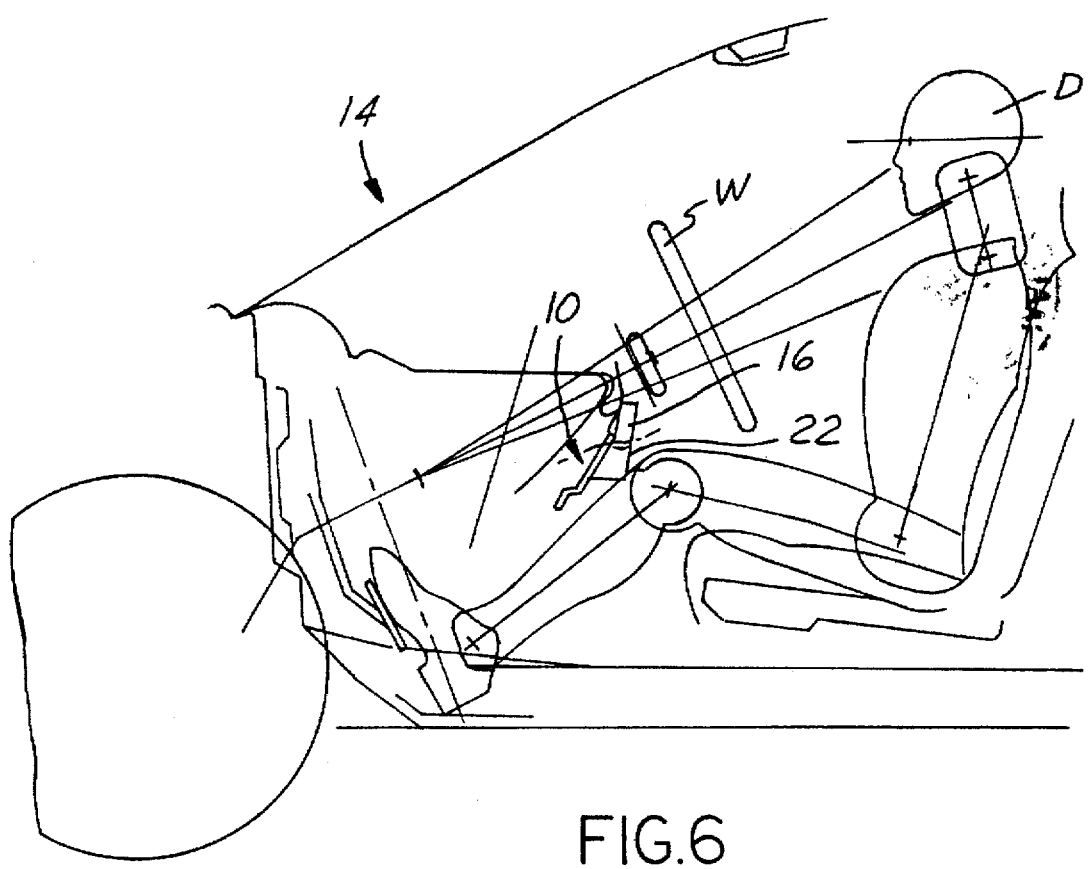
FIG. 6 is a fragmentary somewhat diagrammatic view of the inside of the vehicle as seen from the left, with the instrument panel removed and a crash dummy seated in the driver's seat, showing the proximity of the energy-absorbing plate to the knee of the dummy.
Figure 7:
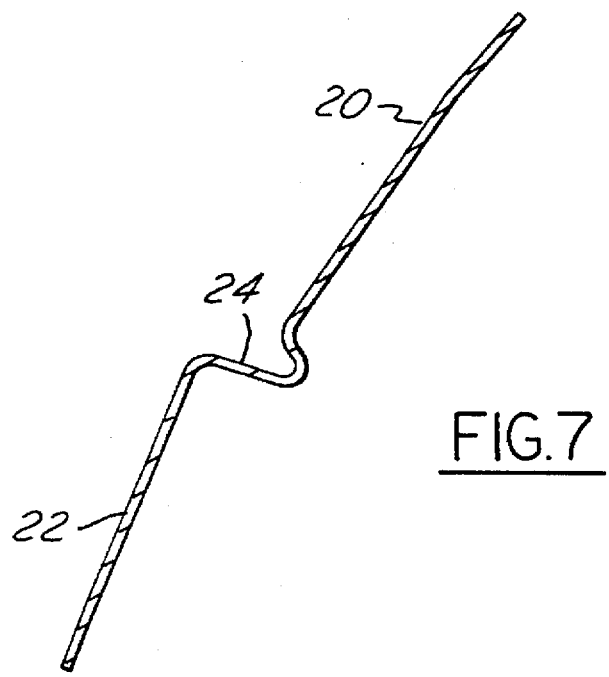
FIG. 7 is a sectional view taken along the line 7—7 in FIG. 3.
Figure 8:
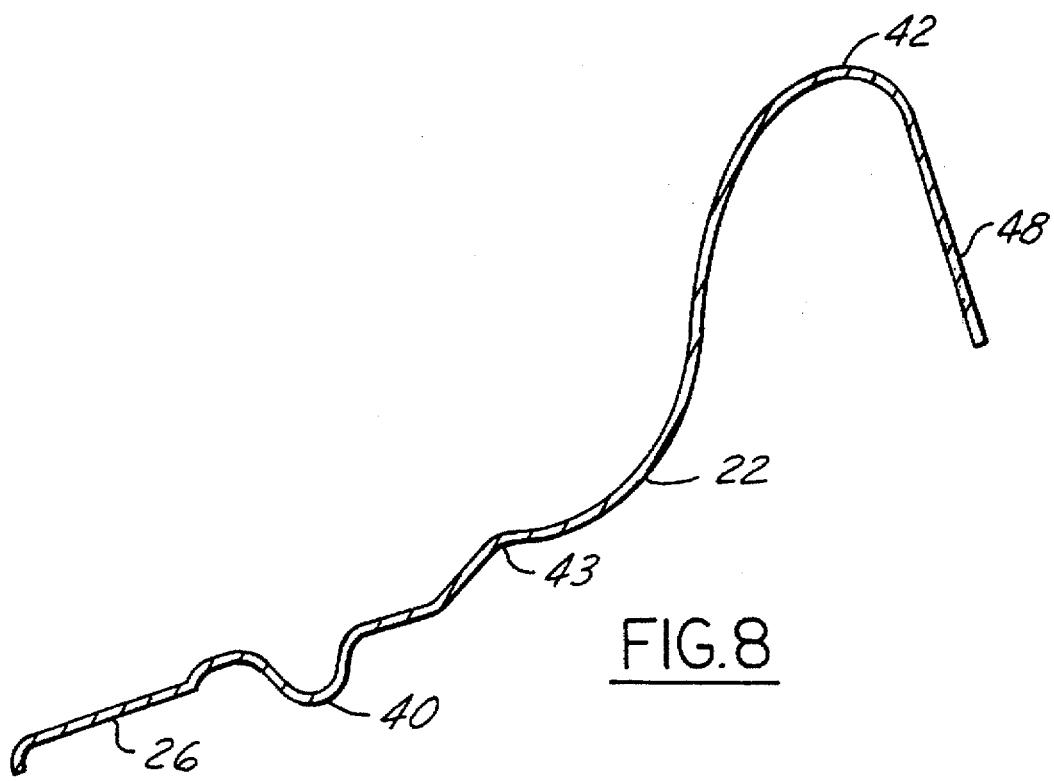
FIG. 8 is a sectional view taken along the line 8—8 in FIG. 3, showing the condition of the plate before impact.
Figure 9:
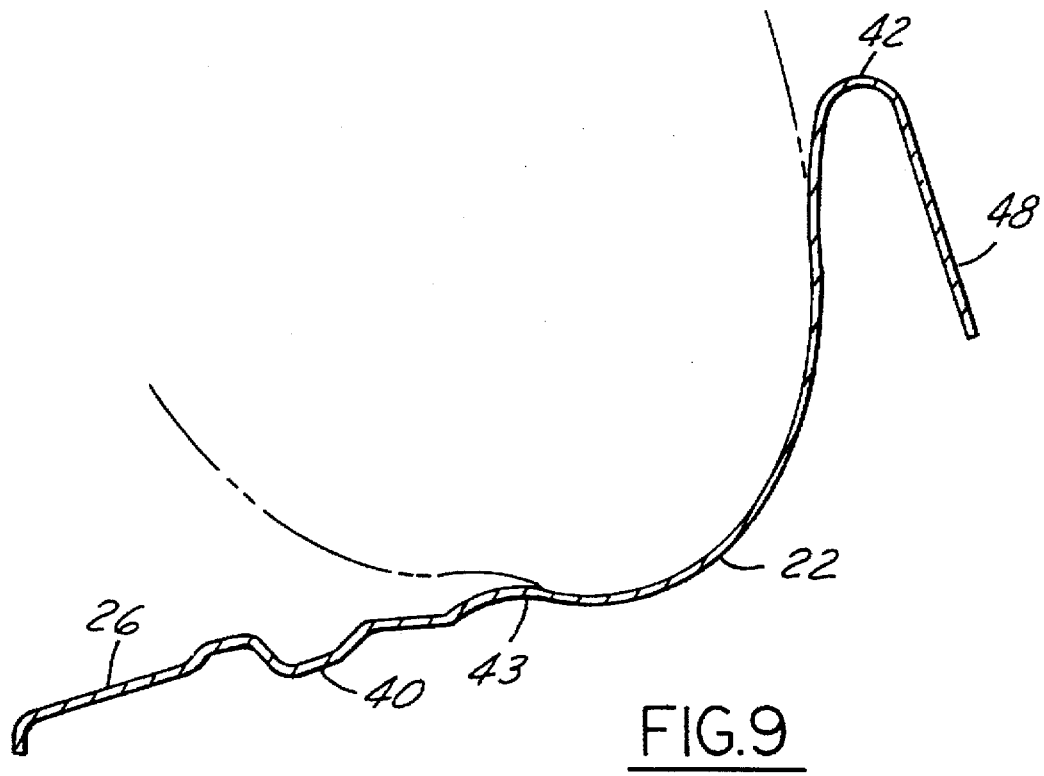
FIG. 9 is a view similar to FIG. 8 but showing the configuration of the plate after impact.

FIG. 6 shows a dummy D seated in the driver seat and it can be seen that the lower wall portion 22 of the plate is directly in front of and closely spaced from the right knee of the dummy.

In use, and in the event of a severe frontal impact in which the driver is thrown forwardly against the steering wheel W, the driver's knee will also be thrust forward into contact with the lower wall portion 22 of the energy-absorbing plate 10. The fact that the lower wall portion 22 is displaced rearwardly of the upper wall portion and therefore closer to the right knee for early contact with the knee to restrain forward motion, enables the plate to have a greater stroke upon impact. The horizontal shelf 24 above the lower wall portion 22 provides additional energy-adsorption and additional stiffness for better crashworthiness.

The bead 40 along one side of the lower wall 22 is capable of deforming upon impact into a shallower channel shape and thus to improve the energy-absorbing ability of the plate. Likewise improved energy absorption results from large radius side edge portion 42 which is capable of rolling with the deformation of the lower wall portion 22 upon impact (See FIGS. 8 and 9). The channel-shaped section 43 opens or flattens upon impact for additional energy absorption.

What is claimed is:

1. An energy-absorbing plate of flexible, resilient material for absorbing energy from the force of a knee of a driver of a motor vehicle when the driver is thrown forward in response to a frontal impact and adapted to be mounted on rigid vehicle support structure in a position forwardly of the right knee of the driver, wherein said plate has a wall and said wall, when said plate is so mounted on the vehicle support structure, is disposed generally vertically and has an upper wall portion and a lower wall portion, said lower wall portion being disposed directly in front of the right knee and displaced rearwardly of the upper wall portion so as to be closer to the right knee and thereby capable of a greater stroke upon impact, said upper and lower wall portions being integrally connected by a generally horizontal shelf providing additional stiffness for better crashworthiness.

2. An energy-absorbing plate as defined in claim 1, wherein said plate has an elongated, vertical, channel-shaped bead laterally adjacent said lower wall portion, said bead being capable of deforming into a shallower channel shape upon impact to improve energy absorption.

3. An energy-absorbing plate as defined in claim 1, wherein said lower wall portion has a relatively large radius side edge portion capable of rolling with the deformation of the lower wall portion upon impact to improve energy absorption.

4. An energy-absorbing plate as defined in claim 3, wherein said relatively large radius side edge portion terminates in a mounting tab for said plate.

5. An energy-absorbing plate as defined in claim 1, wherein said wall has a vertical center line and said shelf extends across said vertical center line perpendicular thereto.

6. An energy-absorbing plate as defined in claim 1, wherein said wall has a side along which extends an integral mounting strip.

7. An energy-absorbing plate as defined in claim 1, wherein said wall has a side along which extends an integral mounting strip, said plate has an elongated, vertical, channel-shaped bead in said mounting strip laterally adjacent said lower wall portion, said bead being capable of deforming into a shallower channel shape upon impact to improve energy absorption, said lower wall portion having a relatively large radius side edge portion remote from said mounting strip capable of rolling with the deformation of the lower wall portion upon impact to further improve energy absorption, said lower wall portion being concave on the side facing the right knee.

8. An energy-absorbing plate as defined in claim 7, wherein said lower wall portion has a channel-shaped section adjacent to said bead which is capable of flattening upon impact.

9. An energy-absorbing plate as defined in claim 8, wherein said wall has a vertical center line and said shelf bisects said vertical center line and is perpendicular thereto.

10. An energy-absorbing plate as defined in claim 9, wherein said relatively large radius side edge portion terminates in a mounting tab.

* * * * *